US009278683B2

(12) United States Patent
Kaltenbach et al.

(10) Patent No.: US 9,278,683 B2
(45) Date of Patent: Mar. 8, 2016

(54) METHOD FOR OPERATING A DRIVE TRAIN AND CONTROL DEVICE

(75) Inventors: Johannes Kaltenbach, Friedrichshafen (DE); Christian Mittelberger, Ravensburg (DE); Viktor Johannes Haeberle, Nersingen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 196 days.

(21) Appl. No.: 14/353,813

(22) PCT Filed: Sep. 13, 2012

(86) PCT No.: PCT/EP2012/067939
§ 371 (c)(1),
(2), (4) Date: Sep. 12, 2014

(87) PCT Pub. No.: WO2013/060526
PCT Pub. Date: May 2, 2013

(65) Prior Publication Data
US 2015/0031502 A1  Jan. 29, 2015

(30) Foreign Application Priority Data
Oct. 24, 2011  (DE) .................. 10 2011 085 109

(51) Int. Cl.
*B60W 10/08* (2006.01)
*B60W 20/00* (2006.01)
(Continued)

(52) U.S. Cl.
CPC ............... *B60W 20/10* (2013.01); *B60K 6/48* (2013.01); *B60W 10/02* (2013.01); *B60W 10/06* (2013.01);
(Continued)

(58) Field of Classification Search
CPC ..... B60W 20/10; B60W 10/02; B60W 10/08; B60W 30/19; B60W 10/06; B60W 10/11; B60W 2710/081; B60W 2510/088; B60K 41/02; B60K 41/08; B60K 41/22; F16H 2061/0422; F16H 3/126; F16H 361/0403; Y10T 477/26
See application file for complete search history.

(56) References Cited
U.S. PATENT DOCUMENTS

2004/0147365 A1* 7/2004 Komeda ............... B60K 6/48
477/6
2013/0060411 A1* 3/2013 Kaltenbach ........... B60W 10/08
701/22
(Continued)

FOREIGN PATENT DOCUMENTS

EP   1 209 017 A2   5/2002
JP      1122109 A2 * 8/2001 ............. B60K 6/442
(Continued)

OTHER PUBLICATIONS

International Search Report issued Nov. 23, 2012 in International Application No. PCT/EP2012/067939.
(Continued)

*Primary Examiner* — Roger Pang
(74) *Attorney, Agent, or Firm* — Brinks Gilson & Lione

(57) ABSTRACT

A method for operating a drive train of a hybrid vehicle with a hybrid drive comprising at least an electric machine and an internal combustion engine, wherein an automated manual transmission is connected between the internal combustion engine and an output, wherein the electric machine is coupled via a friction clutch to a shaft of the automated manual transmission. Wherein in the automated manual transmission, by interruption of the drive torque provided by the hybrid drive on the output, shifts are executed in such a way that in a first phase the drive torque provided at the output is first reduced, subsequently in a second phase the actual gear shift is executed and following that in a third phase drive torque is built up at the output. Wherein for execution of the actual shift after a gear disengagement of an actual gear of the shift and before a gear engagement of a target gear of the shift, the automated manual transmission is synchronized using a flywheel mass of the electric machine such that, when the friction clutch is opened, the rotational speed of the electric machine is brought to an inertial rotational speed and that subsequently the friction clutch is first closed to the inertial synchronization of the manual transmission and subsequently at least partially opened again.

20 Claims, 3 Drawing Sheets

(51) Int. Cl.
*B60K 6/48* (2007.10)
*B60W 10/06* (2006.01)
*B60W 10/111* (2012.01)
*B60W 30/19* (2012.01)
*B60W 10/02* (2006.01)
*B60W 10/04* (2006.01)
*B60W 10/11* (2012.01)
*F16H 3/12* (2006.01)
*F16H 61/04* (2006.01)

(52) U.S. Cl.
CPC ............ *B60W 10/08* (2013.01); *B60W 10/111* (2013.01); *B60W 20/00* (2013.01); *B60W 30/19* (2013.01); *F16H 61/0403* (2013.01); *B60K 41/02* (2013.01); *B60K 41/08* (2013.01); *B60K 41/22* (2013.01); *B60K 2006/4825* (2013.01); *B60W 10/11* (2013.01); *B60W 2510/088* (2013.01); *B60W 2710/081* (2013.01); *F16H 3/126* (2013.01); *F16H 2061/0422* (2013.01); *Y02T 10/6221* (2013.01); *Y02T 10/6252* (2013.01); *Y02T 10/6286* (2013.01); *Y10S 903/902* (2013.01); *Y10T 477/26* (2015.01)

(56) References Cited

U.S. PATENT DOCUMENTS

| | | | | |
|---|---|---|---|---|
| 2013/0296127 | A1* | 11/2013 | Shelton | B60W 20/10 477/5 |
| 2014/0229044 | A1* | 8/2014 | Dai | B60W 20/30 701/22 |
| 2015/0126329 | A1* | 5/2015 | Johri | B60W 10/08 477/5 |

FOREIGN PATENT DOCUMENTS

| | | |
|---|---|---|
| WO | 98/40647 A1 | 9/1998 |
| WO | 2011/141233 A1 | 11/2011 |

OTHER PUBLICATIONS

International Search Report and Written Opinion from corresponding International Patent Application PCT/EP2012/067939, dated Nov. 23, 2012 (German Language).

German Office Action for DE 10 2011 085 109.7, dated Jan. 16, 2014 (German Language).

* cited by examiner

METHOD FOR OPERATING A DRIVE TRAIN AND CONTROL DEVICE

This application is a filing under 35 U.S.C. §371 of International Patent Application PCT/EP2012/067939, filed Sep. 13, 2012, and claims the priority of DE 10 2011 085 109.7, filed Oct. 24, 2011. These applications are incorporated by reference herein in their entirety.

The invention relates to a method for operating a drive train of a hybrid vehicle according to the preamble of claim 1. The invention relates further to a control device for carrying out the method.

The main components of a drive train of a hybrid vehicle are a hybrid drive and a transmission. The transmission converts speeds and torques and in this way provides traction force of the hybrid drive to an output of the drive train. The present invention relates to a method for operating a drive train of a hybrid vehicle whose hybrid drive comprises at least an electric machine and an internal combustion engine, and a control device for carrying out the method. An automated manual transmission is connected between the internal combustion engine and an output. The electric machine is coupled via a friction clutch to a shaft of the automated manual transmission.

Gear shifts are executed in the automated manual transmission by interrupting the drive torques provided by the hybrid drive to the output, namely in such a way that in a first phase the drive torque provided at the output is first reduced, subsequently in a second phase the actual gear shift is executed and following that in a third phase drive torque is again built up at the output. The execution of the actual gear shift or of the actual gear change in the automated manual transmission is divided into in several partial phases, namely a first partial phase in which the actual gear of the gear shift to be executed is disengaged, a second partial phase in which a transmission shaft of the automated manual transmission is synchronized, and a third partial phase in which after the synchronization of the respective transmission shaft the target gear of the gear shift to be executed or of the gear change to be executed is engaged.

In practice the synchronization of the transmission shaft to be synchronized takes place via synchronizing rings. In the process relatively long shift times can occur.

Proceeding from here, the present invention addresses the problem of creating a new type of method for operating a drive train and a control device for carrying out the method. This problem is solved by a method according to claim 1. In accordance with the invention, for executing the actual shift after a gear disengagement of an actual gear of the shift and before a gear engagement of a target gear of the shift, the automated manual transmission is synchronized using a flywheel mass of the electric machine such that, when the friction clutch via which the electric machine is coupled to the manual transmission to be synchronized is opened, the speed of the electric machine is brought to an inertial rotational speed and that subsequently the friction clutch, via which the electric machine is coupled to the manual transmission to be synchronized, is first closed to the inertial synchronization of the automated manual transmission and subsequently at least partially opened again.

The present invention proposes using a flywheel mass torque of the electric machine for synchronization of the automated manual transmission. After the disengagement of the actual gear and prior to the engagement of the target gear of the shift to be executed, a shaft of the automated manual transmission to be synchronized is subjected to an inertial synchronization. As a result of this it is possible to dispense with the synchronizing ring. As a result of this, it is possible on the one hand to simplify the build-up of the automated manual transmission, on the other hand a shortening of shift times and an interruption of traction force can be achieved. Due to the fact that, for inertial synchronization of the automated manual transmission the friction clutch is first closed and subsequently opened again before termination of the synchronization, in the event of engagement of the target gear the inertial mass of the electric machine is not coupled, so that jolts during shifting can be prevented and thus shifting comfort can be increased. Due to the fact that for inertial synchronization the friction clutch is first closed and subsequently opened again before termination of the synchronization, the inertial rotational speed can in addition be determined with greater tolerance. Thus for upshifting a lower inertial rotational speed and for downshifting a higher inertial rotational speed can be used.

According to one advantageous improvement, the friction clutch via which the electric machine is coupled to the manual transmission is first closed to inertial synchronization by increasing the transferrable torque from said friction clutch, so that said friction clutch transfers torque when slipping, wherein subsequently the friction clutch is partially opened such that the transferable torque from said friction clutch is reduced to an amount greater than zero. Through the partial opening of the friction clutch an additional shortening of shift times can be realized.

The inventive control device comprises means for carrying out the method.

Preferred improvements of the invention arise from the subsidiary claims and the following description. Exemplary embodiments, without being restricted to said embodiments, will be described in greater detail with the assistance of the drawing. In the process, the figures show the following:

Figure 1:
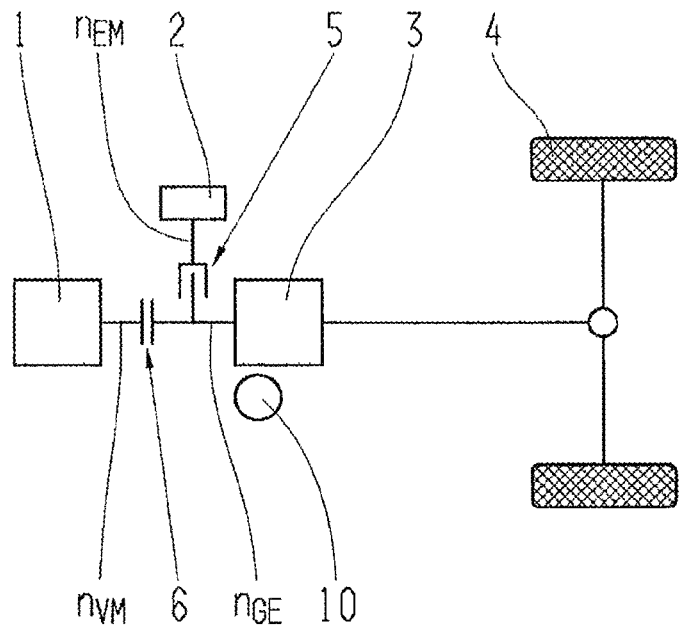
FIG. 1 shows a block diagram of a first drive train according to an embodiment.

FIG. 1 shows a first drive train diagram of a hybrid vehicle according to an embodiment. The drive train of FIG. 1 has an internal combustion engine 1, an electric machine 2, an automated manual transmission 3 as well as an output 4, wherein the automated manual transmission 3 is connected between the internal combustion engine 1 and the output 4. Likewise the automated manual transmission 3 is connected between the electric machine 2 and the output 4.

In FIG. 1 both the internal combustion engine 1 and the electric machine 2 of the hybrid drive engage a transmission input shaft of the automated manual transmission 3. According to FIG. 1 the electric machine 2 engages the transmission input shaft of the automated manual transmission 3 via a friction clutch 5. The internal combustion engine 1 engages the transmission input shaft of the automated manual transmission 3 via a friction clutch 6. When the friction clutch 5 is opened, the electric machine 2 is disconnected from the output 4. When the friction clutch 6 is opened the internal combustion engine 1 is disconnected from the output 4. Thus, in the case of the drive train that is supposed to be operated within the meaning of the present embodiment, the electric machine 2 can be disconnected from the output 4 by opening the friction clutch 5, to be precise also when the internal combustion engine 1 is connected to the output 4 when the friction clutch 6 is closed. Likewise, in the case of an opened friction clutch 6 the internal combustion engine 1 can be disconnected from the output 4 and the electric machine 2 can be connected to the output 4 in the case of a closed friction clutch 5.

As already stated, the transmission 3 is an automated manual transmission. In the automated manual transmission 3 shifting or gear changes are carried out interrupting the drive torque provided by the hybrid drive on the output 4. To this end in accordance with FIG. 3 a three phase procedure is employed such that first, during a first phase the drive torque present on the output 4 and provided by the output aggregate between points in time t1 and t4 is reduced, subsequently in a second phase the actual gear change is executed between points in time t4 and t7, and finally in a third phase drive torque on the output 4 is reduced again between points in time t7 and t8. In the second phase for execution of the actual gear change or of the actual shifting first an actual gear of the shift to be executed is disengaged, namely in FIG. 3 between points in time t4 and t5, wherein subsequently between points in time t5 and t6 the automated manual transmission 3 is synchronized making use of the flywheel mass of the electric machine 2 in order subsequent to the inertial synchronization of this shaft of the automated manual transmission 3 between points in time t6 and t7 to engage the target gear of the shift or gear change to be executed.

Details in this regard will be described in greater detail subsequently with reference to FIG. 3, wherein in FIG. 3 several temporal curve progressions are shown over the time t, namely a curve progression of a torque $M_{VM}$ provided by internal combustion engine 1, a curve progression of a torque $M_{EM}$ provided by the electric machine 2, a curve progression of a torque $M_{KS}$ transferrable from the friction clutch 5 as well as curve progressions of a rotational speed $n_{EM-HS}$ and $n_{EM-RS}$ of the electric machine 2 and of a rotational speed $n_{GE-HS}$ and $n_{GE-RS}$ of the shaft of the automated manual transmission 3, to which the electric machine 2 is coupled or can be coupled via the friction clutch 5, and to be precise both for an upshifting HS as well as also for a downshifting RS.

Figure 3:
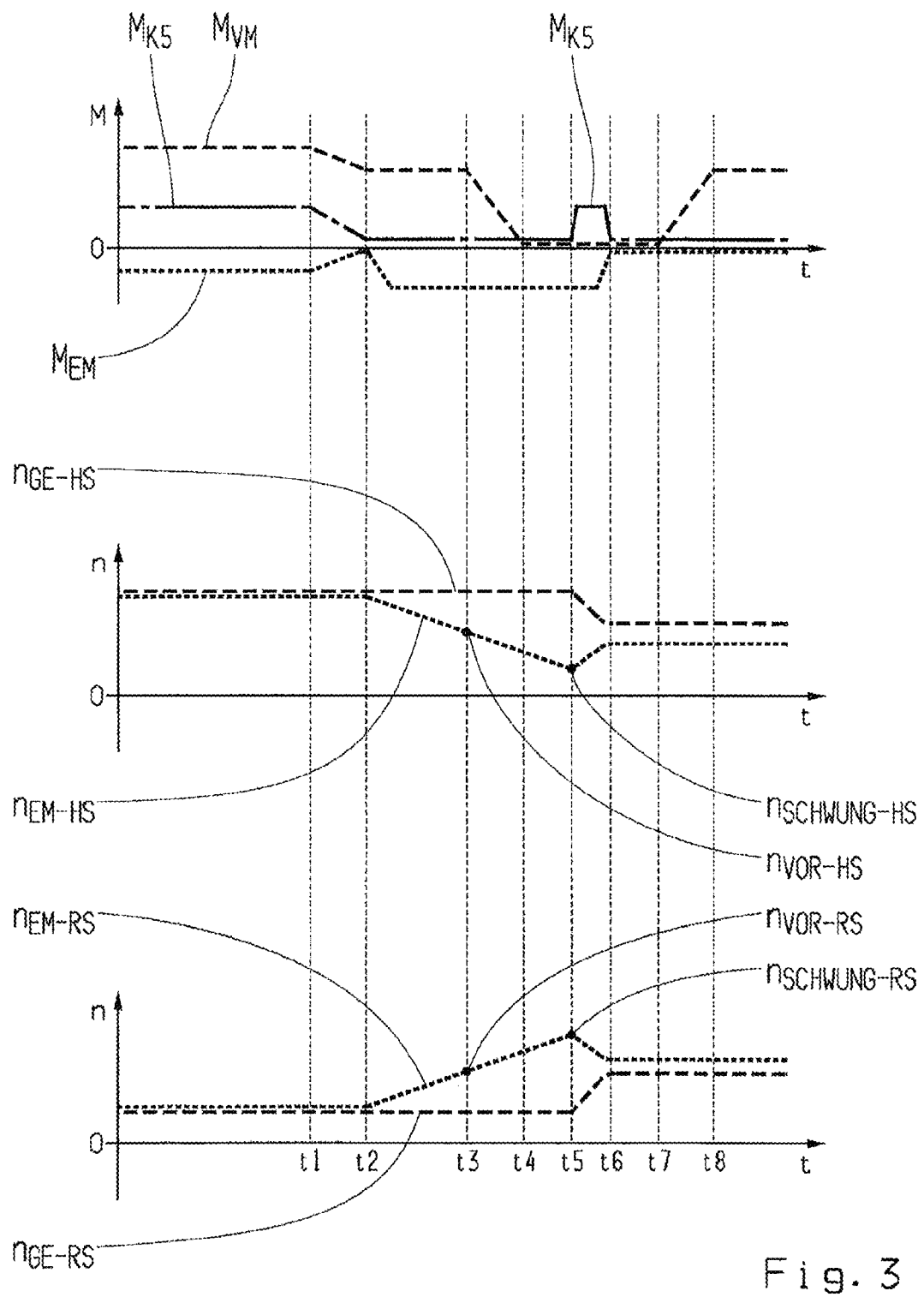
FIG. 3 shows temporal curve progressions of a gear change according to an embodiment.

In FIG. 3 a case is observed in which prior to the point in time t1 the drive train is operated in a hybrid drive, wherein in accordance with FIG. 3 in the event of this hybrid drive the internal combustion engine 1 provides a positive drive torque $M_{VM}$ on the output 4, whereas the electric machine 2 provides a negative drive torque $M_{EM}$ on the output 4. To this end the friction clutches 5, 6 are completely closed or sticking.

At point in time t1 the execution of the method begins, wherein the point in time t1 for example is present whenever a driver either triggers a shift or when a shifting strategy of the manual transmission 3 detects an upcoming shift. An upcoming shift can be detected for example by a transmission control device on the controller system side due to the fact that a driver request, a temporal gradient of a transmission output rotational speed as well as a temporal gradient of a transmission input rotational speed are evaluated.

Beginning at point in time t1 first the drive torque $M_{EM}$ provided by the electric machine 2 on the output 4 is reduced, to be precise, according to FIG. 3 with corresponding adjustment of the drive torque $M_{VM}$ provided by the internal combustion engine 1 on the output 4. Hence it can be inferred from FIG. 3 that in the presented exemplary embodiment between points in time t1 and t2 the regenerative drive torque $M_{EM}$ of the electric machine 2 is reduced to zero, wherein the drive torque $M_{VM}$ provided by the internal combustion engine 1 is reduced by the amount of the previously active regenerative torque $M_{EM}$ of the electric machine 2.

Between points in time t1 and t2, between which thus a load reduction takes place at the electric machine 2 by having the internal combustion engine 1 transfer the load, the friction clutch 5, via which the electric machine 2 coupled to the shaft of the automated manual transmission 3 to be synchronized, namely in the exemplary embodiment of FIG. 1 to the transmission input shaft, is simultaneously opened so that at point in time t2 this friction clutch 5 is completely opened. The torque $M_{KS}$ transferrable by said friction clutch then amounts to zero.

Then, when the friction clutch 5 is completely opened and is no longer transferring torque, subsequently beginning with point in time t2 between points in time t2 and t3 the rotational speed $n_{EM}$ of the electric machine 2 is brought to a preparatory rotational speed $n_{VOR}$, wherein only when the rotational speed $n_{EM}$ has been brought to the preparatory rotational speed $n_{VOR}$ is the drive torque $M_{VM}$ provided by the internal combustion engine 1 also reduced.

In the exemplary embodiment of FIG. 3 the rotational speed $n_{EM}$ of the electric machine 2 reaches the preparatory rotational speed $n_{VOR-HS}$ or $n_{VOR-RS}$ both in the event of the execution of upshifting HS as well as also in the event of the execution of downshifting RS at point in time t3, so that in FIG. 3 beginning with point in time t3 the drive torque $N_{VM}$ provided by the internal combustion engine 1 on the output 4 is reduced, namely between points in time t3 and t4 so that at point in time t4 the torque reduction is completely finished and there is no more drive torque on output 4. Thus, with the reduction of the drive torque $N_{VM}$ provided by the internal combustion engine 1 on the output 4, point in time t3 only begins when the rotational speed $n_{EM-HS}$ or $n_{EM-RS}$ of the electric machine 2 is brought to the preparatory rotational speed $n_{VOR-HS}$ or $n_{VOR-RS}$, namely in the event of upshifting HS said rotational speed is reduced and in the event of downshifting RS it is increased. This can take place either in a speed-controlled manner or in a time-controlled manner.

When the rotational speed $n_{EM}$ of the electric machine 2 is brought to the preparatory rotational speed $n_{VOR}$ between points in time t2 and t3 in a speed-controlled manner, the rotational speed of the electric machine 2 is determined and compared with a corresponding threshold value.

When the rotational speed $n_{EM}$ of the electric machine 2 reaches this threshold value, which corresponds to the preparatory rotational speed or falls below said rotational speed in the event of upshifting HS or exceeds said rotational speed in the event of downshifting RS, subsequently the reduction of the drive torque $M_{VM}$ provided by the internal combustion engine 1 on the output 4 can begin.

As an alternative, it is also possible to bring the rotational speed $n_{EM}$ of the electric machine 2 to the preparatory rotational speed $n_{VOR}$ between points in time t2 and t3 in a time-controlled manner. In the event of such a time-controlled increase or lowering of the rotational speed $n_{EM}$ to the preparatory rotational speed $n_{VOR}$, an unoccupied cycle time is continuously calculated or determined until the rotational speed $n_{EM}$ of the electric machine 2 reaches an inertial rotational speed $n_{SCHWUNG-RS}$ above the preparatory rotational speed $n_{VOR}$ in the event of downshifting RS or reaches an inertial rotational speed $n_{SCHWUNG-HS}$ below the preparatory rotational speed $n_{VOR}$ in the event of upshifting HS. In FIG. 3 the rotational speed $n_{EM}$ reaches the corresponding inertial rotational speed $n_{SCHWUNG}$ at point in time t5 both in the event of the execution of upshifting HS as well as in the event of downshifting RS.

The determined unoccupied cycle time is compared to a threshold value, wherein this threshold value corresponds to the period between points in time t3 and t5. The threshold value to which the determined unoccupied cycle time is compared thus corresponds to the time which is required for load reduction on the internal combustion engine 1 between points in time t3 and t4 and for gear disengagement of the actual gear of the shift to be executed between points in time t4 and t5.

The unoccupied cycle time that is determined in the event of the time-controlled increase or reduction of the rotational speed $n_{EM}$ to the preparatory rotational speed $n_{VOR}$ and compared to the threshold value results from the temporal gradient of the rotational speed $n_{EM}$ of the electric machine 2 and the expected torque progression of the electric machine 2, namely from the maximum providable torque from the electric machine 2. This maximum torque providable by the electric machine 2 for acceleration of said machine depends on the rotational speed $n_{EM}$ of the electric machine 2 and on the performance capability or on the state of charge of the electric energy storage cooperating with the electric machine 2.

When the electric machine 2 has reached the preparatory rotational speed $n_{VOR}$, which is the case in FIG. 3 at point in time t3, subsequently, as already stated, the load reduction is executed between points in time t3 and t4 on the internal combustion engine 1, wherein simultaneously the clutch 6 is opened so that at point in time t4 the clutch 6 is completely opened and the internal combustion engine 1 is disconnected from the output 4.

In the case of an opened clutch 5 and an opened clutch 6 subsequently between points in time t4 and t5 the rotational speed $n_{EM}$ of the electric machine 2 is further reduced in the event of upshifting HS and is further increased in the event of downshifting RS, namely in the direction of the inertial rotational speed $n_{SCHWUNG-RS}$ above the preparatory rotational speed $n_{VOR-RS}$ in the event of downshifting RS or in the direction of the inertial rotational speed $n_{SCHWUNG-HS}$ below the preparatory rotational speed $n_{VOR-HS}$ in the event of upshifting HS. Between points in time t4 and t5 the actual gear of the shift to be executed is also disengaged.

Subsequent to point in time t5, thus after reaching the inertial rotational speed $n_{SCHWUNG}$ between points in time t5 and t6 the inertial synchronization of a shaft of the automated manual transmission 3 to be synchronized takes place. When the rotational speed $n_{EM}$ of the electric machine 2 has reached inertial rotational speed $n_{SCHWUNG}$, which is the case in FIG. 3 at point in time t5, subsequently the friction clutch 5, via which the electric machine 2 is coupled or can be coupled to the automated manual transmission 3, is closed and then opened again, in order to carry out the inertial synchronization of the shaft of the transmission 3 between points in time t5 and t6.

The closing of the friction clutch 5 for the inertial synchronization of the automated manual transmission 3 takes place in such a way that the torque $M_{K5}$ that can be transferred from the friction clutch 5 is increased such that the friction clutch 5 transfers torque when slipping or sliding. The torque transferred from the friction clutch 5 causes the inertial synchronization of the shaft of the automated manual transmission 3 to be synchronized, wherein in this connection torque is supported on the inertial mass of the electric machine 2.

The subsequent opening of the friction clutch 5 in the event of the inertial synchronization takes place prior to the termination of the synchronization, wherein the friction clutch 5 is preferably opened after said friction clutch has been closed when a differential rotational speed between a rotational speed of the shaft of the automated manual transmission 3 to be synchronized and a predefined synchronous rotational speed is lower than a predefined threshold value. For determination of the opening time for the friction clutch 5 a temporal gradient of the current differential rotational speed between the rotational speed of the shaft of the automated manual transmission 3 to be synchronized and the synchronous rotational speed can be monitored in order to guarantee a timely opening of the friction clutch 5.

The closing of the friction clutch 5 for the synchronization of a shaft of the automated manual transmission 3 to be synchronized by increasing the torque $M_{K5}$ to be transferred by said shaft is shown in FIG. 3 between points in time t5 and t6, wherein in the variant of FIG. 3, after the closing of the friction clutch 5 while slipping or sliding by increasing the torque $M_{K5}$ transferrable by said friction clutch subsequently the friction clutch 5 is completely opened in such a way that the torque $M_{K5}$ transferrable by said friction clutch is reduced to zero or about zero. When, at point in time t6 the inertial synchronization of the automated manual transmission 3 is completed, the target gear of the shift to be executed is engaged between points in time t6 and t7. In this connection, in the variant of FIG. 3, since the friction clutch 5 is completely opened and is not transferring any torque, the inertial mass of the electric machine 2 does not encumber a gear shift element engaging the target gear of the shift to be executed.

Figure 4:
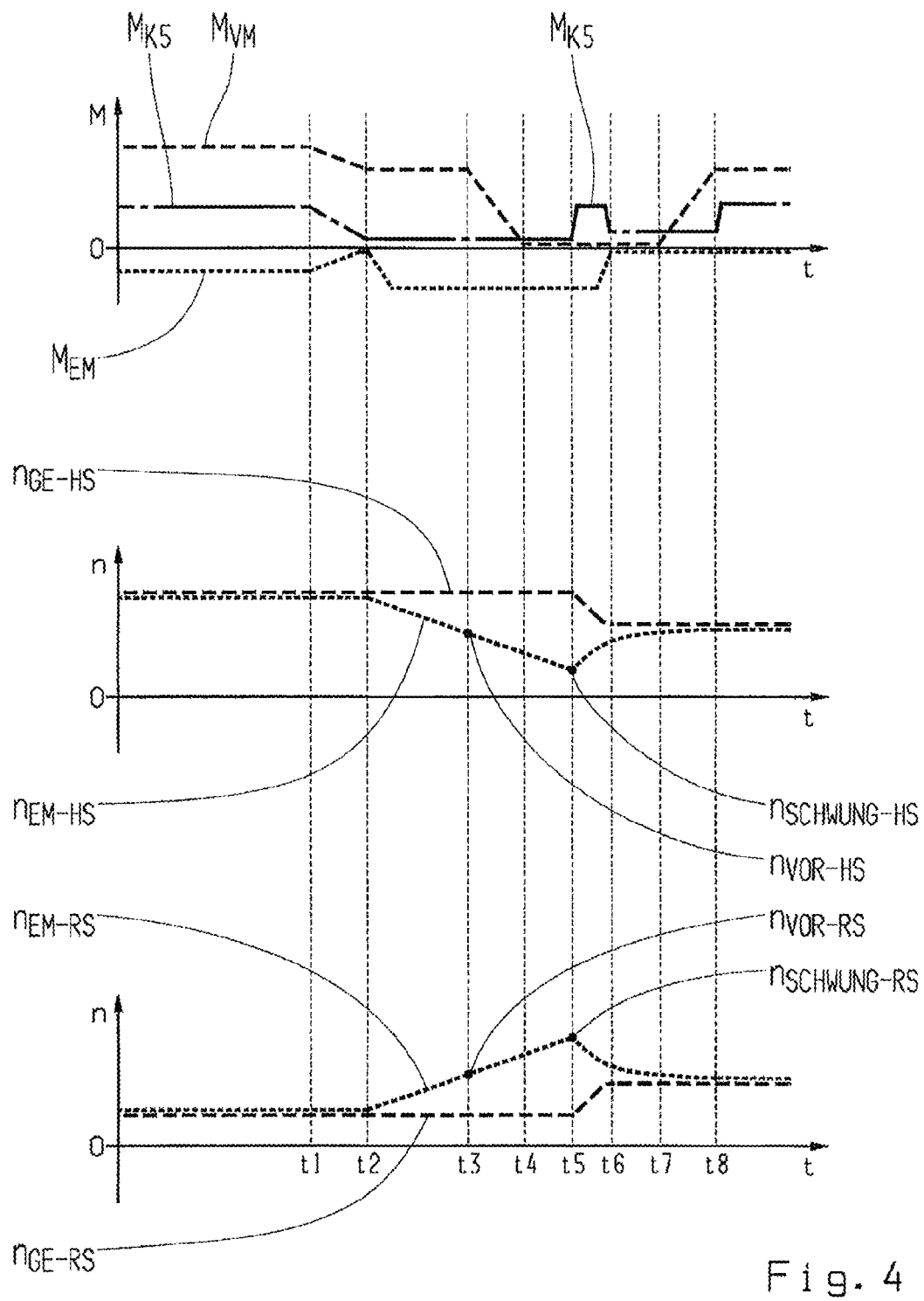
FIG. 4 shows temporal curve progressions of a gear change according to another embodiment.

FIG. 4 shows another embodiment in which, after gear disengagement of the actual gear of the shifting and prior to a gear engagement of the target gear of the shifting for inertial synchronization the torque $M_{K5}$ transferrable by the friction clutch 5 is not subsequently reduced to zero after increasing said torque. Instead, in the variant of FIG. 4 the friction clutch 5, after the closing of the same while slipping and by increasing the torque $M_{K5}$ transferrable by said clutch is subsequently partially opened such that the torque $M_{K5}$ transferrable by said clutch is reduced to an amount greater than zero. In FIG. 4 this can be inferred from the progression of the torque $M_{K5}$ transferrable by the clutch 5.

According to one advantageous improvement during the closing of the friction clutch 5 a torque can be applied via the electric machine 2, namely such that at the end of the synchronization a differential rotational speed is always present on the friction clutch 5. If in the event of the synchronization the clutch sticks undesirably before the synchronous rotational speed is reached, preferably the rotational speed is corrected with the electric machine 2 such that subsequently on the clutch 5 a slippage is again present prior to the engagement of the target gear of the shift to be executed. Thus, in the case of the method, for inertial synchronization the friction clutch 5 is operated such that said clutch does not stick. However, if the clutch does stick undesirably, the rotational speed in the friction clutch 5 is corrected via the torque of the electric machine 2, in order to transfer said clutch back to a slipping or sliding operation prior to the engagement of the target gear of the shift to be executed.

In the embodiment of FIG. 4, in which the friction clutch 5 is not opened completely, but rather only partially opened after the inertial synchronization and therefore can still transfer torque, the inertial mass of the electric machine 2 is likewise disconnected, so that here too jolts can be reduced vis-à-vis a sticking friction clutch 5. A further advantage of the variant of FIG. 4 lies in the fact that tooth on tooth positions in the manual transmission 3 can be terminated via the torque transferred by the friction clutch 5. Since in the embodiment of FIG. 4 the friction clutch is not completely opened prior to the engagement of the target gear of the shift to be executed, a time gain can be realized in the execution of the shift. However, in the embodiment of FIG. 4 the friction clutch 5 must be adjustable.

Thus, in FIG. 4 the friction clutch 5 is only partially opened again no later than point in time t6, so that said clutch still transfers torque. If the target gear of the shift to be executed was engaged between points in time t6 and t7, the friction clutch 5 can stick as a result of which an encumbrance of dog clutches of the automated manual transmission 3 can be reduced. After the clutch 5 sticks, said clutch can be completely closed, i.e. the transferable torque from said clutch can be increased to the maximum transferable torque.

Starting at point in time t7 a load build-up on the internal combustion engine 1 is carried out between points in time t7 and t8, namely with simultaneous closing of the clutch 6, wherein the interruption of traction force on the output 4 ends. Optionally, the friction clutch 5 can be synchronized with the electric machine 2, subsequently the friction clutch 5 can be closed and a load build-up can be carried out on the electric machine 2.

The inertial rotational speed $n_{SCHWUNG}$, to which the electric machine 2 is brought, is preferably determined by calculation, to be precise using the following equation:

$$n_{SCHWUNG} = \sqrt{\frac{(J_{EM} + J_{GE}) * n_{GE\text{-}ZIEL}^2 - J_{GE} * n_{GE\text{-}IST}^2}{J_{EM}}} + \Delta n_{SCHWUNG}$$

As an alternative the inertial rotational speed $n_{SCHWUNG}$ to which the electric machine 2 is brought, can be calculated using the following equation:

$$n_{SCHWUNG} = \frac{J_{GE}}{J_{EM}} * (n_{GE\text{-}ZIEL} - n_{GE\text{-}IST}) + n_{GE\text{-}ZIEL} + \Delta n_{SCHWUNG}$$

In the above equations $J_{EM}$ is the mass inertia of the electric machine, $J_{GE}$ is the mass inertia on the transmission input side based on the shaft of the automated manual transmission to be synchronized, $n_{GE\text{-}IST}$ is the input rotational speed of the shaft of the automated manual transmission to be synchronized in the actual gear of the shift, $n_{GE\text{-}ZIEL}$ is the input rotational speed of the shaft of the automated manual transmission to be synchronized in the target gear of the shift, and $\Delta n_{SCHWUNG}$ is an optional correction offset value.

In the case of the input rotational speed $n_{GE\text{-}IST}$ of the shaft to be synchronized in the actual gear it is a matter in particular of a measured value. In the determination of the input rotational speed $n_{GE\text{-}ZIEL}$ of the shaft to be synchronized in the target gear a current temporal gradient of an output rotational speed can be considered, so that a speed change of the hybrid vehicle during the duration of the shifting sequence can be considered.

With the optional correction offset value $\Delta n_{SCHWUNG}$ the defined inertial rotational speed is reduced in the event of an upshift and the defined inertial rotational speed is increased in the event of a downshift. As a result, it is possible to guarantee that a differential rotational speed between $n_{EM}$ and $n_{GE}$ is present at the friction clutch 5 so that the friction clutch 5 can transfer torque. Thus, the inertial rotational speed is influenced by the correction offset value in such a way that at the end of the synchronization a differential rotational speed between $n_{EM}$ and $n_{GE}$ is present and therefore said speed does not amount to zero. This correction offset value is however limited by the frictional power arising at the friction clutch 5 in this connection.

The calculation of the inertial rotational speed $n_{SCHWUNG}$ can be improved by additionally considering the inertial energy that is lost in slip operating mode of the friction clutch 5, via which the electric machine 2 is coupled or can be coupled to the shaft of the automated manual transmission 3 to be synchronized.

A further improvement in the determination of the inertial rotational speed $n_{SCHWUNG}$ can be brought about by taking into consideration friction torques that have a braking effect. In the case of an upshift to be executed as a consequence of the friction less inertial energy will be required than in the case of neglected friction. In the event of a downshift, on the other hand on the basis of friction more inertial energy will be required than in the case of neglected friction.

Further, in the determination of the inertial rotational speed $n_{SCHWUNG}$ a torque that can be provided electrically by the electric machine 2 can be taken into consideration, said torque being able to be provided for synchronization of the shaft of the automated manual transmission 3 to be synchronized by the electric machine 2 in order to intervene in a supporting manner in slip operating mode of the friction clutch 5 via the electric machine 2. In the event of an upshift HS the inertial rotational speed can be increased and in the event of a downshift RS said speed can be reduced.

According to one advantageous improvement of the embodiments an adjustment for the inertial rotational speed $n_{SCHWUNG}$ can take place.

Whenever, after the closing of the friction clutch 5, which takes place between points in time t5 and t6, a synchronous rotational speed is not reached for the target gear of the shift to be executed, in this connection the inertial rotational speed $n_{SCHWUNG}$ can be adaptively adjusted, namely such that when the synchronous rotational speed is exceeded in the event of an upshift or a downshift, the inertial rotational speed is corrected with a negative offset value. On the other hand, if the synchronous rotational speed of the target gear falls short in the event of an upshift or a downshift, the inertial rotational speed is corrected with a positive offset value. These offset values depend on the shift to be executed, in particular being dependent on the target gear of the shift to be executed.

Figure 2:
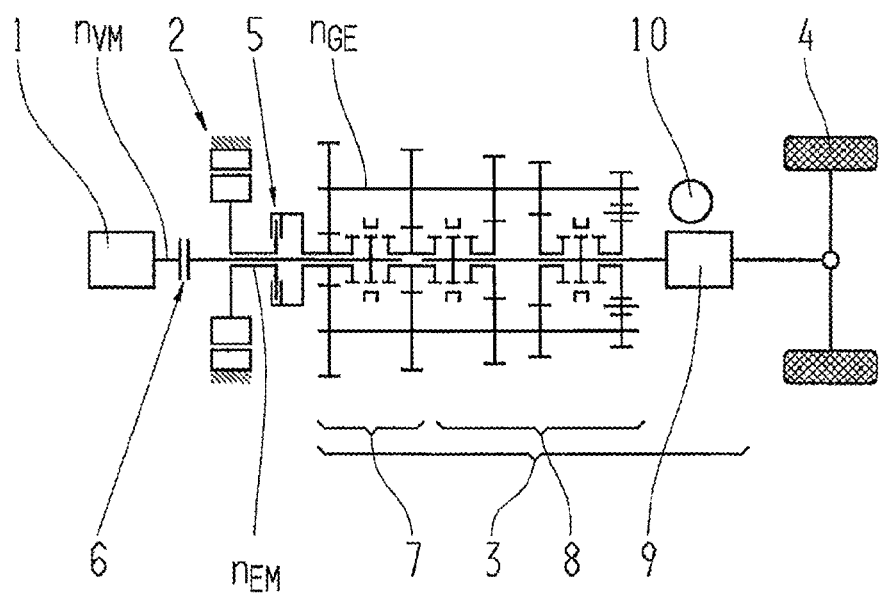
FIG. 2 shows a block diagram of a second drive train according to another embodiment.

The method can be used not only in the drive train of FIG. 1, but rather also in the case of the drive train of FIG. 2, which has an automated manual transmission designed as a range shift transmission. As FIG. 2 shows, the range shift transmission 3 comprises a front mounted unit 7, a main transmission 8 and a rear mounted unit 9. A range shift transmission can in addition to the main transmission also comprise a front mounted unit 7 exclusively or comprise a rear mounted unit 9 exclusively. In FIG. 2 the electric machine 2 can be coupled via a friction cutch 5 to a countershaft of the automated manual transmission 3 designed as a range shift transmission, while the internal combustion engine 1 is coupled via the clutch 6 to the input shaft of the range shift transmission 3.

In the exemplary embodiment of FIG. 2 the electric machine 2 is couple via the friction clutch 5 to the front mounted unit 7, namely an idler gear of the front mounted unit 7 which is in engagement with a fixed gear mounted on the countershaft and forming with the same a transmission gear. In the case of the drive train of FIG. 2 the synchronization of the countershaft of the range shift transmission 3 takes place via the electric machine 2 in analogous manner to the exemplary embodiment of FIG. 1, in which the transmission input shaft of the automated manual transmission 3 was synchronized via the electric machine 2. In the exemplary embodiment of FIG. 2 the rotational speed $n_{GE}$ is not the rotational speed of the transmission input shaft, but rather the rotational speed of the countershaft to be synchronized.

In contrast to the exemplary embodiment of FIG. 2 it is also possible to have the electric machine 2 coupled via the friction clutch 5 in an idler gear of the main transmission 3 or directly to the countershaft. Using the embodiment, in the case of range shift transmissions the transmission brake otherwise ordinarily present can be dispensed with. Simultaneous shifts in the main transmission 8 and in the front mounted unit 7 are possible. Also in the case of range shift transmissions a required shift time can be shortened.

Further, the method can also be used when in the event of the drive train of FIG. 1 an optional constant transmission is connected between the friction clutch 5 and the electric machine 2.

Further an additional flywheel mass can be coupled to the electric machine 2 in order to increase the flywheel mass of said electric machine.

The embodiments further include an electric or electronic control device 10 which has means for carrying out the method, namely at least one processor, at least one memory and at least one communication interface. The control device 10 can be a hybrid control unit or a transmission control unit. The control device 10 determines as output variables control variables for the actuation of at least the electric machine 2 and the friction clutch 5 as well as preferably actuating the internal combustion engine 1 and the friction clutch 6. The control device 10 outputs these output variables via the communication interface. As input variables at least one signal triggering the method, for example a shift triggering by the driver and input rotational speeds of the shaft of the automated manual transmission 3 are provided to the control device 10. The control device 10 reads these input variables via the communication interface or determines said input variables internally.

REFERENCE NUMBERS

1 Internal combustion engine
2 Electric machine
3 Transmission
4 Output
5 Clutch
6 Clutch
7 Front mounted unit
8 Main transmission
9 Rear mounted unit
10 Control device

We claim:

1. A method for operating a drive train of a hybrid vehicle with a hybrid drive comprising at least an electric machine and an internal combustion engine, wherein an automated manual transmission is connected between the internal combustion engine and an output, wherein the electric machine is coupled via a friction clutch to a shaft of the automated manual transmission and wherein in the automated manual transmission, a drive torque provided by the hybrid drive on the output is interrupted, the method comprising:
reducing the drive torque provided at the output in a first phase;
executing an actual gear shift in a second phase; and
building up a drive torque at the output in a third phase,
wherein for executing the actual gear shift after a gear disengagement of an actual gear of the shift and before a gear engagement of a target gear of the shift, the automated manual transmission is synchronized using a flywheel mass of the electric machine such that, when the friction clutch via which the electric machine is coupled to the manual transmission to be synchronized is opened, the rotational speed of the electric machine is brought to an inertial rotational speed and that subsequently the friction clutch is first closed to the inertial synchronization of the automated manual transmission and subsequently at least partially opened again.

2. The method according to claim 1, wherein the friction clutch is opened after closing of the friction clutch prior to termination of the synchronization when a rotational speed differential between a rotational speed of the shaft of the automated manual transmission to be synchronized and of a synchronous rotational speed is lower than a threshold value.

3. The method according to claim 2, wherein for determination of an opening point in time for the friction clutch, a gradient of the rotational speed differential between the rotational speed of the shaft of the manual transmission to be synchronized and the synchronous rotational speed is monitored.

4. The method according to claim 1, wherein the friction clutch for inertial synchronization of the shaft of the automated manual transmission to be synchronized is first closed by increasing a torque transferrable from said friction clutch in such a way that said friction clutch transfers a torque when slipping and that subsequently the friction clutch is completely opened such that the torque transferrable by said friction clutch is reduced to zero.

5. The method according to claim 1, wherein the friction clutch for inertial synchronization of the shaft of the automated manual transmission to be synchronized is first closed by increasing a torque transferrable from said friction clutch in such a way that said friction clutch transfers a torque when slipping and that subsequently the friction clutch is partially opened such that the torque transferrable by said friction clutch is reduced.

6. The method according to claim 1, wherein during the closing of the friction clutch, via which the electric machine is coupled to the manual transmission to be synchronized, a torque is applied via the electric machine in such a way that with termination of the synchronization a defined differential rotational speed is present on the friction clutch when a rotational speed differential between a rotational speed of the shaft of the automated manual transmission to be synchronized and a synchronous rotational speed is lower than a threshold value.

7. The method according to claim 1, wherein when the friction clutch, sticks undesirably, the torque provided by the electric machine is corrected such that the friction clutch slips prior to the engagement of the target gear of the shift.

8. The method according to claim 1, wherein for execution of the shift, the drive torque provided by the electric machine on the output is first reduced by adjustment of the drive torque provided by the internal combustion engine on the output, and subsequently when the friction clutch is opened, the rotational speed of the electric machine is brought to a preparatory rotational speed, and subsequently the drive torque provided by the internal combustion engine on the output is also reduced,
wherein when the drive torque provided by the internal combustion engine on the output is also reduced, the actual gear of the shift is disengaged,
wherein simultaneously with or immediately after the gear disengagement of the actual gear of the shift, the electric machine is brought to the inertial rotational speed above the preparatory rotational speed in the event of a downshift or to the inertial rotational speed below the preparatory rotational speed in the event of an upshift, and
wherein when the electric machine reaches, exceeds or falls short of the inertial rotational speed, the friction clutch is closed for inertial synchronization of the shaft of the automated manual transmission to be synchronized.

9. The method according to claim 1, wherein the defined inertial rotational speed $n_{SCHWUNG}$ is determined by calculation using following formula:

$$n_{SCHWUNG} = \sqrt{\frac{(J_{EM} + J_{GE}) * n_{GE\text{-}ZIEL}^2 - J_{GE} * n_{GE\text{-}IST}^2}{J_{EM}}} + \Delta n_{SCHWUNG}$$

wherein $J_{EM}$ is the mass inertia of the electric machine, wherein $J_{GE}$ is the mass inertia on the transmission input side based on the shaft of the automated manual transmission to be synchronized, wherein $n_{GE\text{-}IST}$ is the input rotational speed of the shaft of the automated manual transmission to be synchronized in the actual gear of the shift, wherein $n_{GE\text{-}ZIEL}$ is the input rotational speed of the shaft of the automated manual transmission to be synchronized in the target gear of the shift, and wherein $\Delta n_{SCHWUNG}$ is an optional correction offset value.

10. The method according to claim 1, wherein the defined inertial rotational speed $n_{SCHWUNG}$ is determined by calculation using following formula:

$$n_{SCHWUNG} = \frac{J_{GE}}{J_{EM}} * (n_{GE\text{-}ZIEL} - n_{GE\text{-}IST}) + n_{GE\text{-}ZIEL} + \Delta n_{SCHWUNG}$$

wherein $J_{EM}$ is the mass inertia of the electric machine, wherein $J_{GE}$ is the mass inertia on the transmission input side based on the shaft of the automated manual transmission to be synchronized, wherein $n_{GE\text{-}IST}$ is the input rotational speed of the shaft of the automated manual transmission to be synchronized in the actual gear of the shift, wherein $n_{GE\text{-}ZIEL}$ is the input rotational speed of the shaft of the automated manual transmission to be synchronized in the target gear of the shift, and wherein $\Delta n_{SCHWUNG}$ is an optional correction offset value.

11. The method according to claim 9, wherein with the correction offset value the defined inertial rotational speed is reduced in the event of an upshift and the defined inertial rotational speed is increased in the event of a downshift.

12. The method according to claim 1, wherein a transmission input shaft is synchronized as the shaft of the automated manual transmission to be synchronized to which the internal combustion engine is also coupled via a clutch.

13. The method according to claim 1, wherein a countershaft of an automated range shift transmission is synchronized as the shaft of the automated manual transmission to be synchronized, wherein the internal combustion engine is coupled to a transmission input shaft of the automated range shift transmission in via a clutch.

14. A control device of a hybrid vehicle configured to carry out the method according to claim 1.

15. The method according to claim 10, wherein with the correction offset value the defined inertial rotational speed is reduced in the event of an upshift and the defined inertial rotational speed is increased in the event of a downshift.

16. The method according to claim 2, wherein the friction clutch for inertial synchronization of the shaft of the automated manual transmission to be synchronized is first closed by increasing a torque transferrable from said friction clutch in such a way that said friction clutch transfers a torque when slipping and that subsequently the friction clutch is completely opened such that the torque transferrable by said friction clutch is reduced to zero.

17. The method according to claim 2, wherein the friction clutch for inertial synchronization of the shaft of the automated manual transmission to be synchronized is first closed by increasing a torque transferrable from said friction clutch in such a way that said friction clutch transfers a torque when slipping and that subsequently the friction clutch is partially opened such that the torque transferrable by said friction clutch is reduced.

18. The method according to claim 2, wherein during the closing of the friction clutch, via which the electric machine is coupled to the manual transmission to be synchronized, a torque is applied via the electric machine in such a way that with termination of the synchronization a defined differential rotational speed is present on the friction clutch when a rotational speed differential between a rotational speed of the shaft of the automated manual transmission to be synchronized and a synchronous rotational speed is lower than a threshold value.

19. A method for operating a drive train of a hybrid vehicle with a hybrid drive comprising at least an electric machine and an internal combustion engine, wherein an automated manual transmission is connected between the internal combustion engine- and an output, wherein the electric machine is coupled via a friction clutch to a shaft of the automated manual transmission, the method comprising:
    detecting upcoming shift by an automated manual transmission control device;
    reducing a drive torque provided by the electric machine on the output in a first phase according to an adjustment of a drive torque provided by the internal combustion engine on the output;
    opening the friction clutch during the first phase;
    executing an actual gear shift; and
    building up a drive torque at the output in a second phase, wherein for executing the actual gear shift after a gear disengagement of an actual gear of the shift and before a gear engagement of a target gear of the shift, the automated manual transmission is synchronized using a flywheel mass of the electric machine such that, when the friction clutch is opened, the rotational speed of the electric machine is brought to an inertial rotational speed and that subsequently the drive torque provided by the internal combustion engine is reduced again.

20. A method for operating a drive train of a hybrid vehicle with a hybrid drive comprising at least an electric machine and an internal combustion engine, wherein an automated manual transmission is connected between the internal combustion engine- and an output, wherein the electric machine is coupled via a friction clutch to a shaft of the automated manual transmission, the method comprising:
    detecting upcoming shift by an automated manual transmission control device;
    reducing a drive torque provided by the electric machine on the output in a first phase according to an adjustment of a drive torque provided by the internal combustion engine on the output;
    opening the friction clutch during the first phase;
    executing an actual gear shift; and
    building up a drive torque at the output in a second phase, wherein for executing the actual gear shift after a gear disengagement of an actual gear of the shift and before a gear engagement of a target gear of the shift, the automated manual transmission is synchronized using a flywheel mass of the electric machine such that, when the friction clutch is opened, the rotational speed of the electric machine is brought to an inertial rotational speed and that subsequently the friction clutch is first closed to the inertial synchronization of the automated manual transmission and subsequently at least partially opened again.

* * * * *